United States Patent [19]

Beynon et al.

[11] Patent Number: 4,806,723

[45] Date of Patent: Feb. 21, 1989

[54] WELD MONITORING

[75] Inventors: Thomas G. R. Beynon; Ian H. Ridley, both of Sheffield, England

[73] Assignee: Land Infrared Limited, Sheffield, England

[21] Appl. No.: 62,629

[22] Filed: Jun. 16, 1987

[30] Foreign Application Priority Data

Jun. 18, 1986 [FR] France ................................. 86 14790

[51] Int. Cl.4 .............................................. B23K 11/24
[52] U.S. Cl. ..................................... 219/109; 219/110
[58] Field of Search ................................ 219/109, 110

[56] References Cited

U.S. PATENT DOCUMENTS 4,214,164  7/1980  Traub et al. ......................... 219/109
4,359,622  11/1982  Dostoomian et al. ............... 219/109
4,388,516  6/1983  Ferrero et al. ....................... 219/109

Primary Examiner—Clifford C. Shaw

Attorney, Agent, or Firm—Finnegan, Henderson, Farabow, Garrett & Dunner

[57] ABSTRACT

Method and apparatus for monitoring the quality of a weld performed with an electrode mounted on an automatically controlled electrode support arm which moves between a rest position and a series of spaced operative positions in each of which a weld operation is performed. The apparatus includes a radiation detector for connection to a monitoring system and a radiation collector attached to the support arm adjacent the electrode and coupled to the radiation detector by optical fibers to receive in use a first level of radiation from electrode and a second level of radiation from the weld zone when the arm is in its operative position. A reference source of radiation is also provided that is located such that when the support arm is in its rest position, the collector receives a third level of radiation from the reference source, whereby the radiation detector generates three signals corresponding to the three levels of radiation impinging on the detector for supply to the monitoring system.

7 Claims, 1 Drawing Sheet

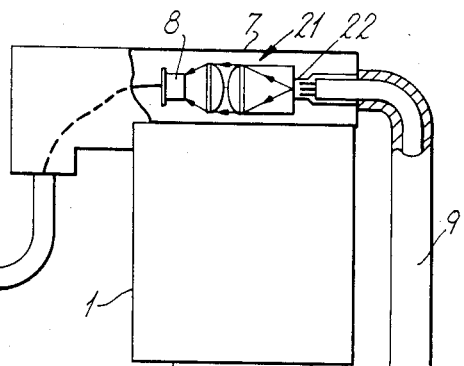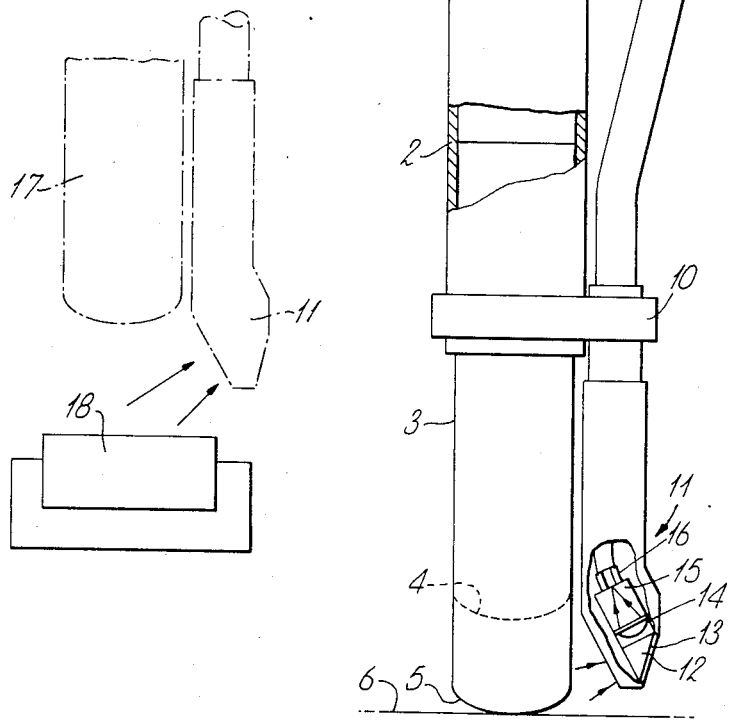

WELD MONITORING

FIELD OF THE INVENTION

The invention relates to methods and apparatus for monitoring the quality of welds, for example spot welds formed by resistance welding techniques.

DESCRIPTION OF THE PRIOR ART

There are many construction techniques, particularly in the motor car industry, which require the performance of a large number of spot welds commonly using resistance welding. It is important to be able to monitor the quality of the spot welds and in the past various techniques have been proposed ranging from manual inspection to ultrasonics. More recently, an on-line monitoring technique has been developed involving the monitoring of the radiation emitted by the weld during a short time interval after the weld has been formed. It is important therefore that as soon as the weld has been completed it is possible to monitor the emitted radiation, typically infrared radiation.

A problem arises from the necessity of using very sensitive detectors due to the fact that the weld is relatively small and cool. The response of these detectors is typically unstable and in conventional systems it is necessary to cause the detector to switch at regular intervals from receiving the radiation being monitored and radiation from two reference sources so that detector response can continually be referenced. This has been achieved in the past by "chopping" the detector on to adjacently mounted reference sources. This is a cumbersome method when used with automatic welding systems involving robot arms and the like even if the detector site is located remotely from the detector arm and connected to an optical collector assembly adjacent the weld by a long length of optical fibre.

SUMMARY OF THE INVENTION

In accordance with one aspect of the present invention, a method of monitoring the quality of a weld performed with the assistance of an automatically controlled electrode support arm which moves periodically from a rest position to a series of spaced operative positions in each of which a weld operation is performed, the support arm being coupled with radiation guide means comprises:

a. causing a radiation detector to receive radiation from the electrode via the guide means when the electrode is at a first, cold temperature and at regular intervals different from the times of occurrence of a weld operation whereby the detector generates a first signal;

b. causing the detector to receive via the guide means radiation from each weld zone as it cools after a welding operation whereby the detector generates a second signal;

c. causing the detector to receive radiation via the guide means from a reference source at a second temperature, higher than the first temperature, when the arm is in its rest position whereby the detector generates a third signal; and d. monitoring the relationship between the first, second and third signals.

This invention enables a considerable simplification in the apparatus required for the monitoring process to be achieved by making use of the movement of the support arm to cause movement of the guide means so that the guide means and hence the detector automatically receives radiation from different areas. It eliminates the need for providing reference sources close to the detector itself and the problems of switching between a monitoring condition and a referencing condition.

In this specification, the term "cold" means that the temperature is such that substantially no radiation which can be sensed by the detector is emitted by the electrode.

In a typical resistance welding operation, the electrode will be water cooled and so at all times apart from when a welding operation is being performed, the electrode will be effectively cold in respect of excitation of the (usually infra-red) detector, thus providing a "zero" reference level. Since with typical detectors it is the zero level which is likely to change most quickly, it is preferable if step a is performed between each weld operation.

Preferably, the monitoring step comprises sampling each second signal at regular intervals and monitoring the relationship between each sampled portion of the second signal and the corresponding first and third signals to derive a signal related to the radiation intensity of the weld zone in the sampling interval. This enables a history of the cooling cycle of the weld zone to be developed thus providing an indication of the weld quality.

Preferably, the detector is coupled with a collector system mounted to part of the support arm whereby the electrode moves relatively to the support arm between the retracted and extended positions, the arrangement being such that when the electrode is in its retracted position radiation from the weld zone impinges on the collector system and when the electrode is in its extended position radiation from the electrode impinges on the collector system.

Preferably, the monitoring step comprises storing the first and third signals; comparing each second signal with the stored signals; and determining the radiation intensity represented by the second signal.

In accordance with a second aspect of the present invention, apparatus for use with a monitoring system for monitoring the quality of a weld performed with the assistance of an automatically controlled electrode support arm which moves periodically in use from a rest position to a series of spaced operative positions in each of which a weld operation is performed comprises a radiation detector for connection to a monitoring system; a radiation collector for attachment to part of the support arm to receive in use radiation from the weld zone and the electrode according to the position of the electrode relatively to the support arm, the radiation collector being coupled with the radiation detector by radiation guide means; and a reference source positioned such that when the support arm is in its rest position, the collector receives radiation from the reference source, the arrangement being such that the radiation detector generates signals in accordance with the radiation impinging on the detector for supply to a monitoring system.

Preferably the detector comprises a photo-sensitive (infra-red) detector such as a lead sulphide detector while the reference source preferably comprises a phase transition reference source of conventional form which may be maintained at a reference temperature such as 250° C.

The radiation guide means will typically comprise optical fibres, preferably formed by glass or quartz with a very low water content.

BRIEF DESCRIPTION OF THE DRAWINGS

An example of a method and apparatus for monitoring the quality of resistance welds will now be described with a reference to the accompanying drawings, in which:

FIG. 1 is a schematic block diagram of the apparatus in one position; and,

FIG. 2 is a partial schematic diagram of the apparatus in another position.

DETAILED DESCRIPTION OF AN EMBODIMENT

The apparatus shown in FIG. 1 comprises a robot arm 1 having a spigot portion 2 within which is mounted an electrode 3. The electrode 3 is axially movable between a retracted position, indicated by a dashed line 4 and an extended position 5 in which it contacts a workpiece 6 to be welded.

A detector assembly 7 is mounted on the robot arm 1 and contains a temperature-stabilised infrared detector 8. Preferably the detector 8 is a lead sulphide detector sensitive to visible wavelengths and to wavelengths up to approximately 2.4 µm. The detector 8 is mounted on a circuit board (not shown) which carries a conventional bridge circuit and differential amplifier. The circuit board is connected to remote diagnostic equipment such as a microcomputer (CPU) 20 with suitable analog to digital interface.

The detector 8 is optically aligned via a lens system 21 with an aperture stop 22 adjacent one end of a length 9 of optical fibre formed from very low water content glass or quartz which is clamped to the spigot portion 2 of the robot arm by a clamp 10. The remote end of the optical fibre 9 is connected to a collector optics arrangement 11.

The collector optics 11 comprises a sapphire right-angle prism 12. The use of sapphire is preferable since this has a very high melting point (in the order of 2000° C.) thus allowing any weld splash to drop away. The major surface 13 of the prism 12 is silvered so that any light passing into the prism is reflected by the prism even if dirty into a lens system 14. Alternatively, a silicon or germanium "wedge" prism, having a high refractive index, may be used to refract the collected light to the lens system 14. Preferably, such high refractive index materials are surface coated to reduce surface reflections.

The lens system 14 focuses radiation onto a suitably shaped aperture stop 15 which may have an elliptical form.

The remote end of the optical fibre 9 terminates in a ferrule 16 mounted to the aperture stop 15.

It is important, particularly due to the relatively small size and low temperatures existing in a weld zone after welding, that the photo-detector 8 has a very high sensitivity. Unfortunately, this high sensitivity is typically accompanied by a significant lack of stability and the detector 8 has to be frequently referenced.

The invention avoids this problem by making use of the movement of the robot arm necessarily made during the welding process. In a typical welding process, the electrode 3 moves from its retracted position 4 into contact with the workpiece 6 and a welding current passes for a short period. The welding current is then turned off and the electrode remains in contact with the workpiece for a further period and is then retracted. After that retraction the weld zone which forms around the area where the electrode 3 contacts the workpiece 6 will cool and the rate at which cooling takes place provides an indication of the quality of the weld. In a typical sequence, up to 26 welds will be made in a single series at a frequency of about 1 weld per second, the welds being laterally spaced apart due to movement of the robot arm relative to the workpiece 6, and then the robot arm will move into a rest position shown in phantom at 17 in FIG. 2. At that stage, the workpiece 6 may be replaced or the original workpiece may be moved to a new position A reference source of radiation 18 is positioned such that when the robot arm moves to the rest position 17, radiation from the source 18 impinges on the collector optics 11. Typically, the reference source 18 will comprise a phase transition source for providing a reference temperature of about 250° C. Radiation from the source 18 passes into the prism 12 of the collector optics 11 and from there to the aperture stop 15 and the optical fibres 9. The radiation passes to the detector 8 which detects the intensity of the radiation and causes an equivalent electrical signal to be generated and to be passed to the diagnostic microcomputer where it is stored.

When a new series of welds is to be completed, the robot arm returns to the position shown in FIG. 1 and the electrode 3 is moved to the welding position 5. Welding current is caused to flow and the weld forms. When the electrode is in this position, radiation from the electrode will enter the collector optics 11 but will be ignored by the diagnostic microcomputer 20. Once the current has been turned off, the electrode 3, which is water cooled via means not shown, will return to a relatively low temperature (usually less than 80° C.) which can be used to set a "zero" reference level for the detector 8. Thus, radiation from the electrode at this stage passes into the collector optics 11 and to the detector 8 which generates an appropriate electrical signal. This signal is also stored by the microcomputer 20.

The electrode 3 is then retracted to reveal the weld zone and radiation from the weld zone will be received by the collector optics 11 and passed along the optical fibres 9 to the detector 8. The detector 8 will detect primarily infrared radiation whose intensity will vary with the size and temperature of the weld, and will generate corresponding electrical signals. These signals are regularly sampled and the radiances they represent are determined by comparison with the two reference signals previously determined. The information can then be used either to control a display indicating the quality of the weld concerned or possibly in a feedback form to cause the apparatus to perform a further weld operation on the same weld zone.

Typically, if the intensity of the detected radiation varies linearly with radiance then the two "reference" radiance can be used to define a linear scale with which the signal from the cooling weld is compared.

This arrangement for determining the two reference levels is particularly suitable for sensitive detectors of the lead sulphide type since they have a relatively stable responsivity but a much less stable "zero" level. It is therefore sufficient to calibrate the detector at the high temperature corresponding to the reference source at relatively large time intervals although it is preferable to calibrate the detector at a low temperature after each weld.

In practical arrangements it is important that the collector optics 11 is positioned close to the electrode 3 but the optics 11 must not be forward of the welding electrode when it is in its welding position. Furthermore, it is important for the collector optics 11 to receive maximum radiation from the weld zone. This is achieved by arranging the optics in the form shown in FIG. 1.

Typical welding electrodes 3 have a circular cross-section which leads to the weld zone also having a circular cross-section. However, simply mounting a converging lens or the like to one side of the electrode 3 would result in radiation being received from an elliptical area on the workpiece 6 which cannot be arranged to conform with the circular weld zone area. Thus, either radiation from outside the weld zone would be received by the collector optics 11 reducing the sensitivity of the detection arrangement or radiation from only a portion of the weld zone will be received leaving to difficulties in deciding on the weld quality.

To avoid this problem, the stop 15 of the collector optics 11 has an elliptical form. This is because the image of a circular area on the workpiece 6 at the stop 15 will be elliptical. In this way, only radiation from the weld zone will be received by the stop 15.

We claim:

1. A method of monitoring the quality of a weld performed with the assistance of an automatically controlled electrode support arm which moves periodically from a rest position to a series of spaced operative positions in each of which a weld operation is performed that forms a weld zone, said support arm being coupled with radiation guide means, the method comprising:
   a. causing a radiation detector to receive radiation via said guide means from an electrode supported by said support arm when said electrode is at a first, cold temperature and at regular intervals different from the times of occurrence of a weld operation whereby said detector generates a first signal;
   b. causing said detector to receive via said guide means radiation from each weld zone as it cools after a welding operation whereby said detector generates a second signal;
   c. causing said detector to receive radiation via said guide means from a reference source at a second temperature, higher than said first temperature, when said arm is in said rest position whereby said detector generates a third signal; and
   d. monitoring the relationship between said first, second and third signals.

2. A method according to claim 1, wherein said monitoring step comprises sampling each said second signal at regular intervals and monitoring the relationship between each sampled portion of said second signal and said corresponding first and third signals to derive a signal related to the radiation intensity of said weld zone in the sampling interval.

3. A method according to claim 1, wherein said detector is coupled with a collector system mounted to part of said support arm whereby said electrode moves relatively to said support arm between said retracted and extended positions, whereby when said electrode is in its retracted position radiation from said weld zone impinges on said collector system and when said electrode is in its extended position radiation from said electrode impinges on said collector system.

4. A method according to claim 1, wherein said monitoring step comprises storing said first and third signals; comparing each second signal with said stored signals; and determining the radiation intensity represented by said second signal.

5. Apparatus for use with a monitoring system for monitoring the quality of a weld comprising, in combination, an electrode mounted on an electrode support arm which arm moves periodically in use from a rest position to a series of spaced operative positions in each of which a weld operation is performed and a weld zone is formed on a workpiece, said electrode being moveable between a retracted position and an extended position relative to said support arm, a radiation detector adapted to be connected to a monitoring system, a radiation collector coupled to said radiation detector by radiation guide means and attached to said support arm adjacent said electrode to receive a first level of radiation from the electrode when the arm is in an operative position and the electrode is in an extended position and to receive a second level of radiation from the weld zone when the arm is in an operative position and the electrode is in a retracted position and a reference source of radiation positioned such that when said support arm is in its rest position, said collector receives a third level of radiation from said reference source, whereby said radiation detector generates three signals corresponding to the three radiation levels impinging on the detector for supply to the monitoring system.

6. The apparatus of claim 5, wherein said detector comprises a photosensitive detector, and said reference source comprises a phase transition source for providing a reference temperature.

7. The apparatus claim 5, wherein said radiation guide means comprise optical fibers.

* * * * *